(12) United States Patent
Long

(10) Patent No.: US 12,172,404 B2
(45) Date of Patent: Dec. 24, 2024

(54) PROCESS FOR FORMING A CONTAINER

(71) Applicant: KOOL GLOBAL SOLUTIONS PTY LTD, Kurrimine Beach (AU)

(72) Inventor: Tom Joseph Long, Kurrimine Beach (AU)

(73) Assignee: KOOL GLOBAL SOLUTIONS PTY LTD, Kurrimine Beach (AU)

( * ) Notice: Subject to any disclaimer, the term of this patent is extended or adjusted under 35 U.S.C. 154(b) by 277 days.

(21) Appl. No.: 17/914,523

(22) PCT Filed: Apr. 19, 2021

(86) PCT No.: PCT/AU2021/050348
§ 371 (c)(1),
(2) Date: Sep. 26, 2022

(87) PCT Pub. No.: WO2021/207802
PCT Pub. Date: Oct. 21, 2021

(65) Prior Publication Data
US 2023/0134346 A1   May 4, 2023

(30) Foreign Application Priority Data

Apr. 17, 2020   (AU) ................................ 2020901223

(51) Int. Cl.
*B31B 50/26*   (2017.01)
*B29D 22/00*   (2006.01)
(Continued)

(52) U.S. Cl.
CPC .......... *B31B 50/262* (2017.08); *B29D 22/003* (2013.01); *B31B 50/745* (2017.08);
(Continued)

(58) Field of Classification Search
None
See application file for complete search history.

(56) References Cited

U.S. PATENT DOCUMENTS 5,857,778 A * 1/1999 Ells .................... B65D 81/3858
383/110
10,745,187 B1 * 8/2020 Vincent ............. B65D 81/3858
(Continued)

FOREIGN PATENT DOCUMENTS

| WO | 1988/010214 A1 | 12/1988 |
| WO | 2016/187435 A2 | 11/2016 |
| WO | 2020/006593 A1 | 1/2020 |

OTHER PUBLICATIONS

International Search Report (ISR) for PCT/AU2021/050348 mailed May 28, 2021 (9 pages).
(Continued)

*Primary Examiner* — Tanzim Imam
(74) *Attorney, Agent, or Firm* — Shumaker, Loop & Kendrick, LLP

(57) ABSTRACT

A process for forming a container from a blank, the process comprising the steps of: thermally inducing one or more fold lines on at least one surface of a container blank fabricated from a thermal insulation sheet material, wherein the blank comprises: a first panel portion; a second panel portion located adjacent the first panel portion and sharing a first common edge therewith; and a third panel portion located adjacent the second panel portion and sharing a second common edge therewith, the second common edge being substantially parallel to the first common edge, wherein the first panel portion and the third panel portion are each associated with a pair of flap members adapted for folding movement relative to the respective first and third panel portions such that, when assembled, each of the flap members overlies an edge of the second panel portion substantially perpendicular to the first common edge and the second common edge, folding the first panel portion of the container blank along a first fold line, wherein when folded, the first panel portion is substantially perpendicular to the second (Continued)

panel portion of the container blank; folding the third panel portion of the container blank along a second fold line, wherein when folded, the third panel portion is substantially perpendicular to the second panel portion and substantially parallel to the first panel portion; sealing a portion of each of the pair of flap members of the first panel portion to a portion of each of the pair of flap members of the third panel portion to form a side seam joint; and sealing a portion of the first panel portion adjacent the side seam joint and a portion of the third panel portion adjacent the side seam joint to an edge of the second panel portion to form a bottom seam joint.

22 Claims, 6 Drawing Sheets

(51) Int. Cl.
*B31B 50/74* (2017.01)
*B65D 25/20* (2006.01)
*B65D 81/38* (2006.01)
*B31B 120/10* (2017.01)
*B31B 120/30* (2017.01)

(52) U.S. Cl.
CPC ......... *B65D 25/20* (2013.01); *B65D 81/3851* (2013.01); *B65D 81/3858* (2013.01); *B31B 2120/102* (2017.08); *B31B 2120/302* (2017.08)

(56) References Cited

U.S. PATENT DOCUMENTS

| | | | |
|---|---|---|---|
| 2008/0260303 | A1 | 10/2008 | De Lesseux et al. |
| 2017/0291731 | A1 | 10/2017 | Balazs |
| 2018/0299059 | A1* | 10/2018 | McGoff .................. B32B 27/32 |
| 2019/0352075 | A1 | 11/2019 | Waltermire et al. |
| 2021/0130075 | A1* | 5/2021 | Long .................. B65D 81/3851 |

OTHER PUBLICATIONS

Written Opinion (WO) for PCT/AU2021/050348 mailed May 28, 2021 (8 pages).

\* cited by examiner

PROCESS FOR FORMING A CONTAINER

TECHNICAL FIELD

The present invention relates to a process for forming a container from a blank and a container formed therefrom.

BACKGROUND ART

Known packaging for the storage and transportation of temperature sensitive items, such as seafood, includes expanded polystyrene (Styrofoam) boxes and polyethylene coated or wax impregnated corrugated fibreboard boxes which are packed with a chilling material, such as ice, to keep the items chilled whilst out of the cold chain storage and ensure delivery within the recommended temperature range (which for seafood is usually 2° C. to 8° C.).

The disadvantage of using expanded polystyrene boxes is that they have a limited lifespan due to disintegration of the box during use. In addition, expanded polystyrene poses an environmental hazard as polystyrene can break down into small pieces which are not appreciably biodegradable. Additionally, this type of packaging material tends to have poor barrier properties and consequently may be subject to contamination by its contents. Other thermal insulating containers also have limited reusability due to use of single-use plastic liner bags in transportation boxes. Further, although some thermal insulating containers may be leak proof, these comprise single-use plastic liner bags, or liner bags having a pouch-like construction which has the limitation of not filling the available space within a packing box and being difficult to clean for re-use. While some liners do conform to a box-like shape, these are of a foldable construction or are multi-piece and are therefore not fully sealed along all edges and not leak proof, in addition, these liners often contain creases, folds or other excess materials which can trap contaminants or are difficult to clean.

In addition, the efficiency of use is limited as the present thermal insulating containers have fixed dimensions and can be bulky to transport and store when not in use as they are not collapsible.

Thus, there would be an advantage if it were possible to provide an improved container or at least one that ameliorates the aforementioned problems.

It will be clearly understood that, if a prior art publication is referred to herein, this reference does not constitute an admission that the publication forms part of the common general knowledge in the art in Australia or in any other country.

SUMMARY OF INVENTION

The present invention is directed to a process for forming a container from a blank and a container formed therefrom which may at least partially overcome at least one of the abovementioned disadvantages or provide the consumer with a useful or commercial choice.

With the foregoing in view, the present invention, in one form, resides broadly in a process for forming a container from a blank, the process comprising the steps of:

thermally inducing one or more fold lines on at least one surface of a container blank fabricated from a thermal insulation sheet material, wherein the blank comprises:
  a first panel portion;
  a second panel portion located adjacent the first panel portion and sharing a first common edge therewith; and
  a third panel portion located adjacent the second panel portion and sharing a second common edge therewith, the second common edge being substantially parallel to the first common edge,
wherein the first panel portion and the third panel portion are each associated with a pair of flap members adapted for folding movement relative to the respective first and third panel portions such that, when assembled, each of the flap members overlies an edge of the second panel portion substantially perpendicular to the first common edge and the second common edge,
folding the first panel portion of the container blank along a first fold line, wherein when folded, the first panel portion is substantially perpendicular to the second panel portion of the container blank;
folding the third panel portion of the container blank along a second fold line, wherein when folded, the third panel portion is substantially perpendicular to the second panel portion and substantially parallel to the first panel portion;
sealing a portion of each of the pair of flap members of the first panel portion to a portion of each of the pair of flap members of the third panel portion to form a side seam joint; and
sealing a portion of the first panel portion adjacent the side seam joint and a portion of the third panel portion adjacent the side seam joint to an edge of the second panel portion to form a bottom seam joint.

Throughout the specification and claims, the terms "a container blank" and "a blank for forming a container" are used interchangeably.

The container blank may be formed in any suitable manner. However, it will be understood that the method of forming the container blank may vary depending on a number of factors, such as the type of material the container blank is fabricated from and the complexity of the container blank. Such methods would be known to a person of skill in the art. For instance, the container blank may be formed by applying a template to a thermal insulation sheet material and cutting or stamping out the container blank from the thermal insulation sheet material. In an embodiment of the invention, the container blank may be formed by a die cutting process. Any suitable die cutting process may be used. For instance, the die cutting process may be flatbed die cutting, laser cutting, water jet cutting, press die cutting, rotary die cutting, or any suitable combination thereof.

In an embodiment of the invention, the container blank may be formed by rotary die cutting. Any suitable rotary die cutting process may be used. In some embodiments of the invention, the rotary die cutting process may use flexible cylindrical rotary dies or may use solid cylindrical rotary dies. In a preferred embodiment of the invention, the container blank may be formed using a flexible cylindrical rotary die process. In this instance, it will be understood that the template (die) may be a thin sheet of flexible material. In some embodiments of the invention, the rotary die cutter may cut the design substantially through the thermal insulation sheet material or at least partially through the thermal insulation sheet material. In this instance, it will be understood that the rotary die cutter may cut through one or more layers of the thermal insulation sheet material.

The first panel portion, the second panel portion and the third panel portion may be of any suitable size relative to one another. For instance, in some embodiments of the invention, each of the first panel portion, the second panel portion and the third panel portion may be substantially the same size as one another. Alternatively, at least one of the first panel portion, the second panel portion and the third panel portion may be of different sizes to one another. The first panel portion, the second panel portion and the third panel portion may be different to one another in any suitable dimension, and in particular the length and the width thereof. It is envisaged that the thickness of the blank may be substantially constant.

In an embodiment of the invention, the third panel portion may be larger than the first panel portion and the second panel portion. In particular, it is envisaged that the length of the third panel portion may be greater than the length of the first panel portion and the second panel portion. In a specific embodiment, the length of the third panel portion may be approximately similar to the combined length of the first panel portion and the second panel portion. In this instance, it is envisaged that when assembled, a portion of the third panel portion may overlie the second panel portion and at least a portion of the first panel portion to form a lid portion for the container. In an embodiment of the invention, when assembled, a portion of the third panel portion may overlie at least a portion of the first panel portion forming an outer surface of the container. Alternatively, when assembled, a portion of the third panel portion may overlie at least a portion of the first panel portion and may be configured to be folded into the container such that it contacts an inner facing of the first panel portion and substantially closes the container.

The first panel portion and the third panel portion may comprise one or more subpanel portions. The subpanel portions may be of any suitable size, shape or configuration. For instance, the third panel portion may comprise a subpanel portion that when assembled forms a lid portion of the container. In this instance, it is envisaged that the subpanel portion forming the lid portion may be at least the width of the second panel portion (which forms the bottom of the container when assembled) and at least the length of the subpanel portion of the third panel portion (which forms the side wall of the container when assembled). For instance, the first panel portion and the third panel portion may each comprise a subpanel portion that may be folded to provide an edge seal. In this instance, it is envisaged that the subpanel portion is substantially continuous along the length of the respective first and third panel portions, but of relatively narrow width. For instance, the first panel portion and the third panel portion may each comprise a subpanel portion that when assembled assist in reusably closing the container. In this instance, it is envisaged that the subpanel portion may be at least the length of the respective first and third panel portions.

The first panel portion and the third panel portion may be associated with a pair of flap members. The flap members may be associated with the first panel portion and the third panel portion in any suitable manner. For instance, the flap members may be integrally formed with the container blank or may be formed separately and attached to the container blank. In an embodiment of the invention, the flap members may be integrally formed with the container blank.

In an embodiment of the invention, at least one of the first panel portion and the third panel portion may be provided with two or more pairs of flap members. For instance, the third panel portion may be provided with a first pair of flap members associated with a portion of the third panel portion that, when assembled, may form a wall (and preferably a back wall) of the container and a second pair of flap members associated with a subpanel portion that, when assembled, may form a lid portion of the container. In this instance, it is envisaged that the two or more pairs of flap members may be folded independently of one another.

In an embodiment of the invention, each flap member of the pair of flap members may be located adjacent the respective first and third panel portions and share a common edge therewith. The pair of flap members may be associated with any suitable edge of the respective first and third panel portions. Preferably, however, the pair of flap members may be associated with opposite edges of the respective first and third panel portions. In an embodiment, when assembled, each flap member of the pair of flap members may be located substantially parallel to one another.

The pair of flap members may be of any suitable size, shape and configuration. For instance, in some embodiments of the invention, each flap member of the pair of flap members may be substantially the same size, shape and configuration as one another. Alternatively, a first flap member of the pair of flap members may be of a different size to the second flap member of the pair of flap members. The first flap member and the second flap member of the pair of flap members may be different to one another in any suitable dimension, and in particular the length and the width thereof. It is envisaged that the thickness of the container blank may be substantially constant.

For instance, in some embodiments of the invention, each pair of flap members of the respective first and third panel portions may be substantially the same size, shape and configuration as one another. Alternatively, the pair of flap members associated with the first panel portion may be of a different size to the pair of flap members associated with the third panel portion. The pair of flap members of the respective first and third panel portions may be different to one another in any suitable dimension, and in particular the length and width thereof. Preferably, the length of the pair of flap members of the third panel portion may be greater than the length of the pair of flap members of the first panel portion. In an embodiment of the invention, the length of the pair of flap members of the third panel portion may be substantially similar to the length of the third panel portion. In an alternative embodiment of the invention, the length of the pair of flap members of the third panel portion may be less than the length of the third panel portion. In an embodiment of the invention, one or more fold lines may be located in a part of the pair of flap members, such that the one or more fold lines substantially align with one or more fold lines located in an adjacent panel portion. In this instance, it is envisaged that the fold lines may assist in folding the flap members into the same configuration as the adjacent panel portion.

Preferably, however, when assembled, the flap members may be of sufficient size that each of the flap members of the respective first and third panel portions overlies an edge of the second panel portion substantially perpendicular to the first common edge and the second common edge.

Preferably, the flap members may be adapted for folding movement relative to the respective first and third panel portions. In use, it is envisaged that one or more fold lines may be provided along part of the common edge shared by a flap member and respective panel portion.

In an embodiment of the invention, at least one flap member of the pair of flap members and the subpanel portion of the respective first and third panel portions may share a common edge. In a preferred embodiment of the invention, each flap member of the pair of flap members and the subpanel portion of the respective first and third panel portions may share a common edge. In this instance, it is envisaged that one or more fold lines may be located along part of the common edge to assist in folding the flap member and the subpanel portion relative to one another. Alternatively, at least a portion of the flap member and/or the subpanel portion may be cut out such that the flap member and the subpanel portion may be folded relative to one another the amount of overlapping material may be minimised. In an alternative embodiment of the invention, each flap member of the pair of flap members and the subpanel portion of the respective first and third panel portions may not share a common edge. In this instance, each flap member and subpanel portion of the respective first and third panel portions may be folded independently of one another.

When assembled, it is envisaged that the second panel portion may form a bottom panel of the container, the first panel portion may form a wall of the container (and in particular a front wall of the container), the third panel portion may form a wall (and in particular a back wall) and a lid portion of the container and the flap members may form side walls of the container.

When assembled, the first panel portion may be located at any suitable position relative to the second panel portion. For instance, the first panel portion may be located at an angle of between 40° and 140° to the second panel portion. More preferably, the first panel portion may be located at an angle of between 60° and 120° to the second panel portion. Yet more preferably, the first panel portion may be located at an angle of between 80° and 100° to the second panel portion. Most preferably, the first panel portion may be located at an angle of between 85° and 95° to the second panel portion.

When assembled, the third panel portion may be located at any suitable position relative to the second panel portion. For instance, the third panel portion may be located at an angle of between 40° and 140° to the second panel portion. More preferably, the third panel portion may be located at an angle of between 60° and 120° to the second panel portion. Yet more preferably, the third panel portion may be located at an angle of between 80° and 100° to the second panel portion. Most preferably, the third panel portion may be located at an angle of between 85° and 95° to the second panel portion.

In a preferred embodiment, both the first panel portion and the third panel portion may be located substantially perpendicular to the second panel portion when the container is assembled. Preferably, the first panel portion and the third panel portion may be located substantially parallel to one another. In a preferred embodiment of the invention, the flap members may be located substantially perpendicular to first panel portion, the second panel portion and the third panel portion.

The blank for forming a container may be fabricated from any suitable material. Preferably, the container blank may be fabricated from any suitable type of material having thermal insulation properties. In an embodiment of the invention, the container blank may be fabricated from a sheet material. In a preferred embodiment of the invention, the container blank may be fabricated from a flexible sheet material. Preferably, the flexible sheet material may be in roll form. In an embodiment of the invention, the container blank may be fabricated from a thermal insulation sheet material. Any suitable thermal insulation sheet material may be used. However, it is envisaged that in use, the thermal insulation sheet material may reflect radiant heat, thereby reducing or minimising temperature increases for objects at least partially surrounded by the thermal insulation sheet material.

The thermal insulation sheet material may comprise at least one layer. In an embodiment of the invention, the thermal insulation sheet material may be a multi-layer structure. In an embodiment of the invention, the thermal insulation sheet material comprises an insulation layer located between at least one upper layer and at least one lower layer. In a preferred embodiment of the invention, the insulation layer may comprises a foam layer, wherein the foam layer may be fabricated from an extruded polymer, an expanded polymer, a foamed polymer, or any suitable combination thereof. In some embodiments of the invention, the insulation layer may be fabricated from a closed cell foam material or an open cell foam material. In a preferred embodiment of the invention, the insulation layer may be fabricated from a closed cell foam material. Preferably, the insulation layer may be fabricated from a cross-linked closed cell foam material. Any suitable cross-linked closed cell foam layer may be used. For instance, the cross-linked closed cell foam layer may be chemically cross-linked closed cell foam layer, a physically cross-linked closed cell foam layer, or any suitable combination thereof. Preferably, the insulation layer may be fabricated from a cross-linked closed cell polyethylene foam layer.

In a preferred embodiment of the invention, the at least one upper layer and at least one lower layer may be formed a polymer sheet material, wherein the polymer sheet material may be fabricated from polyethylene, polypropylene, polyvinyl chloride, polyethylene terephthalate, polycarbonate, acrylonitrile butadiene styrene or the like, or any suitable combination thereof. In some embodiments of the invention, the at least one upper layer and the at least one lower layer may be fabricated from the same type of materials or from different types of material. Preferably, the at least one upper layer and the at least one lower layer may be fabricated from polyethylene.

In an embodiment of the invention, the thermal insulation sheet material comprises at least one polymer sheet material laminated to the insulation layer. In use, it is envisaged that a laminated thermal insulation sheet material does not comprise any cavities behind the polymer sheet material which resists contamination of the insulation layer. In an embodiment of the invention, the thermal insulation sheet material may be laminated prior to being used in the process of the present invention. In a preferred embodiment of the invention, the thermal insulation sheet material may be laminated as a step in the process of the present invention. Preferably, the thermal insulation sheet material may be laminated before one or more fold lines are induced on at least one surface of a container blank formed from a thermal insulation sheet material. Advantageously, the retained heat from the lamination process may facilitate the thermal inducement of the fold lines in the thermal insulation sheet material.

In an embodiment of the invention, the thermal insulation sheet material comprises a foam layer encapsulated between one or more layers of a reflective material and one or more layers of an antimicrobial material. Preferably, the thermal insulation sheet material may comprise a cross-linked closed cell foam layer encapsulated between a metalised polyethylene film outer layer and an antimicrobial film inner layer.

Preferably, the blank for forming a container may be fabricated from a flexible thermal insulation sheet material. Preferably, the blank for forming a container may be fabricated from water resistant thermal insulation sheet material. Preferably, the blank for forming a container may be assembled from a food grade approved thermal insulation sheet material. For the purposes of the specification, the term 'food grade' means the blank for forming a container is permitted to come into contact with food for human or animal consumption.

In a preferred embodiment, the container blank may be provided with resistance to one or more environmental factors. For instance, the container blank may be water resistant, waterproof, UV-resistant, chemical resistant, impact resistant, fire resistant, or a combination thereof. In a preferred embodiment of the invention, the container blank may be at least water resistant. Preferably, the container blank may be substantially waterproof, such that if cooling material or frozen goods stored in a container formed from the container blank defrost, the resulting water does not contaminate an inner layer of the container blank.

Any suitable means of providing the container blank with water resistance may be used. For instance, the container blank may be formed of a substantially water-resistant thermal insulation sheet material, may be provided with a water repellent coating, may be provided with a lining having a high moisture barrier, or combinations thereof. Preferably, the thermal insulation sheet material may have sealed edges. In this way, the thermal insulating capacity of the material may be improved and the sheet material may have improved water-resistance. Any suitable technique to seal the edges of the sheet material may be used. However, it will be understood that the sealing technique may vary depending on a number of factors, such as the type of sheet material to be sealed, the thickness of the sheet material, and the degree of sealing required. For instance, the edges of the sheet material may be sealed by using an adhesive or adhesive tape, impulse heat treatment, heat treatment, chemical treatment, mechanical treatment (such as ultrasonic welding, compression, and the like), or a combination thereof.

Preferably, when assembled, a reflective layer of the thermal insulation sheet material forms an outer facing of the container and an antimicrobial layer of the thermal insulation sheet material forms an inner facing of the container.

The process for forming a container from a blank comprises forming one or more fold lines on at least one surface of a container blank fabricated from a thermal insulation sheet material. The one or more fold lines may be located on any suitable surface of the container blank. For instance, the fold lines may be located on an inner facing of the container blank, on an outer facing of the container blank, or on an inner facing and an outer facing of the container blank. In a preferred embodiment of the invention, one or more fold lines may be located on an inner facing of the container blank. The fold lines may be located on any suitable portion of the container blank. For instance, the fold lines may be located near an edge of the container blank, within the area defined by a panel portion of the container blank, between two adjacent panel portions, or any suitable combination thereof. Preferably, however, the fold lines may be located in a portion of the container blank which facilitates the folding of the panel portions and/or folding of at least a portion of the periphery of the container blank to form an edge seal.

The fold lines may be of any suitable size, shape and configuration. However, it will be understood, that the size, shape and configuration of the fold lines may vary depending on a number of factors, such as the type and thickness of the material the container blank is fabricated from, the configuration of the container blank, and the desired end configuration of the panel portions to be folded.

The fold lines may be of any suitable depth. However, it is envisaged that the fold lines may be of sufficient depth that they facilitate the folding of the panel portions. For instance, the fold lines may extend at least partially into the insulation layer of the container blank from the inner facing of the container blank, may extend at least partially into the insulation layer of the container blank from an outer facing of the container blank, may extend at least partially into the insulation layer of the container blank from the inner facing of the container blank and the outer facing of the container blank.

The one or more fold lines may be oriented relative to one or more other fold lines. For instance, the container blank may be provided with a fold line located perpendicular to a second fold line forming an L-shape, may be provided with a fold line located perpendicular to a second fold line forming a T-shape, may be provided with a fold line located perpendicular to a second fold line forming an X-shape, may be provided with a fold line located at a 45° angle relative to a second fold line, may be provided with a pair of fold lines, each fold line located at a 45° angle relative to a third fold line and at a 90° angle relative to each other, or the like.

The container blank may be provided with one or more pairs of parallel fold lines. Each of the pair of parallel fold lines may be spaced apart by any suitable thickness. In an embodiment, the first thickness is approximately the thickness of the container blank. In use, it is envisaged that providing the container blank with one or more pairs of parallel fold lines may facilitate the folding of the panel portions. For instance, the pair of parallel fold lines may reduce the stress on the material, may assist in ensuring predictable angles between adjacent panel portions, may enable a panel portion to nest within a fold formed between two adjacent panel portions, may enable a fold formed between two adjacent panel portions to nest within a fold formed between two different adjacent panel portions, or the like.

The process for forming a container from a blank comprises the step of forming one or more fold lines on at least one surface of a container blank fabricated from a thermal insulation sheet material. The one or more fold lines may be formed at any suitable stage of forming the container blank. For instance, the one or more fold lines may be formed before the container blank is cut or stamped out, during the cutting or stamping out of the container blank, after the container blank has been cut or stamped out, or any suitable combination thereof. In an embodiment of the invention, a template for a container blank may comprise one or more fold line locating portions. In this instance, it is envisaged that the fold line locating portions may enable the location of the fold lines to be marked onto a surface of the container blank. Any suitable means of marking the location of the fold lines on a surface of the container blank may be used. In an embodiment of the invention, the fold lines may be formed using the one or more fold line locating portions.

The fold lines may be formed by any suitable method. For instance, the fold lines may be formed by cutting or perforating, by heating, by lasing, by pressing a material between a shaped die portion and an anvil portion, by pressing a material between complementary co-acting shaped die portions, by using a thermally sensitive adhesive, or the like. In a preferred embodiment of the invention, the one or more fold lines may be thermally induced on at least one surface of a container blank fabricated from a thermal insulation sheet material. Preferably, the fold lines may be formed by impulse heating, thermal heating, compression, or any suitable combination thereof. Preferably, however, the method of forming the fold lines does not puncture or otherwise damage the container material or affect its resistance to an environmental factor, such as water resistance. In a preferred embodiment of the invention, one or more fold lines may be formed during the rotary die cutting process. In this instance, it is envisaged that one or more shaped die portions may compress the thermal insulation sheet material against an anvil portion until a fold line is formed. Preferably, the one or more shaped die portions may be heated.

In an embodiment of the invention, the container blank comprises one or more monitoring devices embedded in at least one surface of the container blank. The monitoring device may be of any suitable type, and may monitor any suitable parameter associated with a container blank and/or a container formed from the container blank. Preferably, however, the one or more monitoring devices provide information regarding the condition of the container blank and/or the container formed from the container blank. For instance, a suitable monitoring device may be an electronic monitoring device. The electronic monitoring device may include an electronic chip, an Internet of Things (IoT) module, a data logger, radio frequency identification (RFID) chip, near field communication (NFC) tag, smart tag, or the like. It is envisaged that in use, the monitoring device may be used to track and/or trace the container blank and/or the container formed from the container blank, identify worn or damaged components, monitor temperature or humidity at one or more locations within the container formed from the container blank, or combinations thereof.

The one or more monitoring devices may be located in any suitable portion of the container blank. However, it will be understood that the location of the monitoring device may vary depending on a number of factors, such as the function of the monitoring device and the frequency of transmission (both in terms of the frequency in time with which the monitoring device transmits and/or the radio frequency on which the monitoring device transmits). In an embodiment of the invention, the monitoring device may be located on a surface of the container blank. In this instance, it is envisaged that the monitoring device may be at least partially covered by a polymer film, to provide the monitoring device with a protective barrier and to secure the monitoring device to the container blank. In an embodiment of the invention, the monitoring device may be located within the container formed from the container blank.

In an embodiment of the invention, the process for forming a container from a blank includes the step of embedding one or more monitoring devices in at least one surface of a container blank fabricated from a thermal insulation sheet material. The monitoring device may be of any suitable type, and may monitor any suitable parameter associated with a container blank and/or a container formed from the container blank. Preferably, however, the one or more monitoring devices provide information regarding the condition of the container blank and/or the container formed from the container blank. For instance, a suitable monitoring device may be an electronic monitoring device. The electronic monitoring device may include an electronic chip, an Internet of Things (IoT) module, a data logger, radio frequency identification (RFID) chip, near field communication (NFC) tag, smart tag, or the like. It is envisaged that in use, the monitoring device may be used to track and/or trace the container blank and/or the container formed from the container blank, identify worn or damaged components, monitor temperature or humidity at one or more locations within the container formed from the container blank, or combinations thereof.

The one or more monitoring devices may be located in any suitable portion of the container formed from the container blank. However, it will be understood that the location of the monitoring device may vary depending on a number of factors, such as the function of the monitoring device and the frequency of transmission (both in terms of the frequency in time with which the monitoring device transmits and/or the radio frequency on which the monitoring device transmits). In an embodiment of the invention, the monitoring device may be located on a surface of the container formed from the container blank. In this instance, it is envisaged that the monitoring device may be at least partially covered by a polymer film, to provide the monitoring device with a protective barrier and to secure the monitoring device to the container formed from the container blank. In an embodiment of the invention, the monitoring device may be located within the container formed from the container blank.

The one or more monitoring devices may be embedded at any suitable stage of forming the container blank. For instance, the one or more monitoring devices may be embedded before the container blank is cut or stamped out, during the cutting or stamping out of the container blank, after the container blank has been cut or stamped out, or any suitable combination thereof. In a preferred embodiment of the invention, the one or more monitoring devices may be embedded in the container blank during the cutting or stamping out of the container blank.

The one or more monitoring devices may be embedded using any suitable method. For instance, the one or more monitoring devices may be adhered to the container blank using an adhesive or adhesive tape, impulse heat treatment, heat treatment, chemical treatment, mechanical treatment (such as ultrasonic welding, compression, and the like), or a combination thereof. In this instance, it is envisaged that the monitoring devices may comprise a substrate, such as a thermoplastic material, or the like, which may be configured for adherence to the container blank. For instance, the monitoring devices may be embedded in one or more layers of the thermal insulating sheet material during fabrication of the thermal insulation sheet material. For instance, the one or more monitoring devices may be printed or imprinted to the container blank.

In some embodiments of the invention, the one or more monitoring devices may be embedded in at least one surface of a container blank using hot gas welding and/or a profiled heat stamp. In a preferred embodiment of the invention, the one or more monitoring devices may be embedded during the rotary die cutting process. In this instance, it is envisaged that the one or more shaped die portions may compress a portion of the monitoring device against the thermal insulation sheet material. Preferably, the one or more shaped die portions may be heated.

In an embodiment of the invention, the process for forming a container from a blank includes the step of sealing one or more edges of the container blank. Any suitable edge of the container blank may be sealed. Preferably, one or more edges of the container blank which may not be joined to an adjacent edge of the container blank may be sealed. In an embodiment of the invention, a portion of an edge of one side of the container blank may be sealed and a portion of the same edge may not be sealed. In this instance, it is envisaged that the unsealed portion of an edge may be joined to an adjacent unsealed portion of an edge of the container blank. In an embodiment of the invention, at least a portion of the periphery of the container blank may be sealed. In an alternative embodiment of the invention, substantially all of the periphery of the container blank may be sealed. In this way, the thermal insulating capacity of the container blank is improved, and the container blank has improved water-resistance. In an embodiment of the invention, at least a portion of the periphery of the container blank may be sealed prior to assembling the container blank into a container. Alternatively, at least a portion of the periphery of the container blank may be sealed during assembly of a container from a container blank.

Any suitable sealing device may be used to seal the edges of the container blank. However, it will be understood that the method of forming an edge seal may vary depending on a number of factors, such as the type of thermal insulation sheet material to be sealed, the thickness of the thermal insulation sheet material, and the degree of sealing required. For instance, the edges of the container blank may be sealed by using an adhesive or adhesive tape, impulse heat treatment, heat treatment, chemical treatment, mechanical treatment (such as ultrasonic welding, compression, and the like), or a combination thereof.

In an embodiment of the invention, a portion of the thermal insulation sheet material may be pre-compressed to reduce the thickness of the inner insulation layer prior to forming the edge seal. In this instance, it is envisaged that the portion of the thermal insulation sheet material may comprise one or more edges of the thermal insulation sheet material. In an embodiment of the invention, a portion of the thermal insulation sheet material may be pre-treated so as to facilitate the sealing of the edge. Any suitable pre-treatment may be used. For instance, the one or more edges may be provided with an adhesive, may be chemically treated, may be thermally treated (such as, but not limited to, hot air treatment, or the like), may be subjected to an electrical discharge treatment (such as, but not limited to corona discharge treatment, a plasma treatment, or the like), or any suitable combination thereof. In use, it is envisaged that the pre-treatment step may assist in forming an edge seal having improved water and thermal resistance.

In an embodiment of the invention, the one or more edges of the container blank may be sealed using a heat treatment. In this instance, it is envisaged that one or more layers of the thermal insulation sheet material may be heat sealed to an adjacent layer of the thermal insulation sheet material to substantially enclose the insulation layer therein and to form the edge seal. In a preferred embodiment of the invention, the one or more edges of the container blank may be sealed using a heat treatment under compressive force. In this instance, it is envisaged that the compressive force may reduce the thickness of the inner insulation layer in the area about the edge seal. In an embodiment of the invention, the one or more edges of the container blank may be sealed using impulse welding. In this instance, it is understood that the portion of the edges being sealed remains under pressure during heating. Preferably, the sealing process comprises a cool down phase, wherein the portion of the edges being sealed remains under pressure during a heating and cooling cycle. In an embodiment of the invention, the one or more edges of the container blank may be sealed during the rotary die cutting process. In this instance, it is envisaged that one or more shaped die portions may compress the thermal insulation sheet material against an anvil portion until an edge seal is formed. Preferably, the one or more shaped die portions may be heated.

In an embodiment of the invention, excess material may be trimmed after the edge seal is formed. In this instance, it is envisaged that a cutting bar associated with the sealing device may be used to trim excess material. In an embodiment of the invention, a rotary die cutting process may form an edge seal by compression and trim excess material simultaneously. Alternatively, at least a portion of the periphery of the container blank may be folded prior to forming an edge seal. In this instance, it is envisaged that the folded portion of the container blank may be heat sealed to the container blank to form the edge seal.

The process for forming a container from a blank comprises the step of folding a first panel portion of the container blank along a first fold line, wherein when folded, the first panel portion is substantially perpendicular to a second panel portion of the container blank.

The first fold line may be located in any suitable location in the container blank. Preferably, however, the location of the first fold line facilitates the folding of the first panel portion relative to the second panel portion. In a preferred embodiment of the invention, the first fold line may be located along part of a common edge shared by the first panel portion and the second panel portion, wherein the common edge is a first common edge. The first fold line may be continuous or discontinuous along part of the first common edge. However, it will be understood that the configuration of the first fold line may vary depending on a number of factors, such as the type of material to be folded, the shape and size of the container blank to be folded and the length of the first common edge.

The first panel portion may be folded along the first fold line in any suitable direction. Preferably, however, the inner facing of the first panel portion is folded towards the inner facing of the second panel portion. The first panel portion may be folded along the first fold line at any suitable angle. Preferably, however the first panel portion is substantially perpendicular relative to the second panel portion when folded. It will be understood that the first panel portion does not need to be positioned so as to extend precisely at a 90° angle relative to the second panel portion, and that relatively small deviations from perpendicular are acceptable and will not affect the performance of the invention.

The process for forming a container from a blank comprises the step of folding a third panel portion of the container blank along a second fold line, wherein when folded, the third panel portion is substantially perpendicular to the second panel portion and substantially parallel to the first panel portion.

The second fold line may be located in any suitable location in the container blank. Preferably, however, the location of the second fold line facilitates the folding of the third panel portion relative to the second panel portion. In a preferred embodiment of the invention, the second fold line may be located along part of a common edge shared by the third panel portion and the second panel portion, wherein the common edge is a second common edge. The second fold line may be continuous or discontinuous along part of the second common edge. However, it will be understood that the configuration of the second fold line may vary depending on a number of factors, such as the type of material to be folded, the shape and size of the container blank to be folded and the length of the second common edge.

The third panel portion may be folded along the second fold line in any suitable direction. Preferably, however, the inner facing of the third panel portion is folded towards the inner facing of the second panel portion. The third panel portion may be folded along the second fold line at any suitable angle. Preferably, however the third panel portion is substantially perpendicular relative to the second panel portion when folded. It will be understood that the third panel portion does not need to be positioned so as to extend precisely at a 90° angle relative to the second panel portion, and that relatively small deviations from perpendicular are acceptable and will not affect the performance of the invention.

Preferably, the second common edge may be substantially parallel to the first common edge. In this instance, it may be understood that when the first panel portion is folded along the first fold line and the third panel portion is folded along the second fold line such that the first panel portion and the third panel are substantially perpendicular to the second panel portion, the first panel portion and the third panel portion may be substantially parallel to one another. It will be understood that the first panel portion does not need to be positioned so as to extend precisely at a 180° angle relative to the third panel portion, and that relatively small deviations from parallel are acceptable and will not affect the performance of the invention.

The process for forming a container from a blank comprises the step of sealing a portion of each of the pair of flap members of the first panel portion to a portion of each of the pair of flap members of the third panel portion to form a side seam joint. Any suitable portion of the flap members and/or the first panel portions may be sealed to any suitable portion of the flap members and/or the third panel portions to form a side seam joint. For instance, the inner facings may be sealed together, the outer facings may be sealed together, the inner insulation layers may be sealed together, or any suitable combination thereof. Preferably, both the inner facings and the outer facings of the flap members and/or the first panel portions may be sealed to the respective inner facings and respective outer facings of the flap members and/or the third panel portions. In this instance, it will be understood that the step of sealing the respective inner facings and/or the outer facings together fuses or welds the materials together such that the resulting layers may be substantially resistant to separation. In use, it is envisaged that the side seam joint and/or bottom seam joint formed by the process of the invention may comprise a laminated material wherein the thermal insulation sheet material of each of the respective flap members and/or panel portions may be substantially fused together.

In an embodiment of the invention, the inner facings and the outer facings of the flap members and/or first panel portions may be sealed to the respective inner facings and respective outer facings of the flap members and/or third panel portions substantially simultaneously. Preferably, the respective inner facings may be sealed together before the respective outer facings may be sealed together. However, it will be understood that the order in which the respective inner facings and respective outer facings may be sealed together may vary depending on the type and combination of sealing devices used, the type and composition of the thermal insulation sheet material and the desired properties of the side seam joint and/or bottom seam joint.

Preferably, the laminated material at the side seam joints and/or bottom seam joints formed by the process may be substantially water-tight and leak proof. Preferably, the laminated material at the side seam joint and/or bottom seam joint formed by the process may be substantially resistant to delamination. In this instance, it will be understood that under tensile stress the joined polymer sheet layers of the laminated material resist separation. In use, it is envisaged that fusing the inner facings of the thermal insulation sheet material together at the side seam joint and/or bottom seam joint forms a leak-proof container and reduces risk of contaminant entry with reuse of the container and fusing the outer facings of the thermal insulation sheet material together at the side seam joint and/or bottom seam joint may prevent contaminant entry and may prevent delamination of the outer facings around the side seam joint and/or bottom seam joint under stress and particularly when the container may be flat-packed. In an embodiment of the invention, fusing the inner facings together and fusing the outer facings together may form a laminated material at the seam joint capable of resisting delamination under stress better than seam joints formed by lamination of the inner layers of film only.

Any suitable portion of each of the pair of flap members of the first panel portion may be sealed to a portion of each of the pair of flap members of the third panel portion to form a side seam joint. In a preferred embodiment of the invention, the portion of each of the pair of flap members of the first panel portion and/or the third panel portion comprises an edge of the respective flap members. Preferably, the portion of the first panel portion may be a first flap member located adjacent the first panel portion and sharing a common edge therewith and preferably, the portion of the third panel portion may be a third flap member located adjacent the third panel portion and sharing a common edge therewith. In this instance, it is envisaged that the first flap member may be sealed to the third flap member to form a side seam joint. In use, it is envisaged that the common edge between the panel portion and the flap member may be provided with one or more fold lines to facilitate folding of the flap member relative to the panel portion.

In an embodiment of the invention, the side seam joint extends at least a portion of the length of each of the pair of flap members of the first panel portion and/or the third panel portion. The side seam joint may extend any suitable length of each of the pair of flap members of the first panel portion and/or the third panel portion. For instance, the side seam joint may extend substantially the entire length of each of the pair of flap members of the first panel portion, may extend substantially the entire length of each of the pair of flap members of the third panel portion, may extend at least partially the length of each of the pair of flap members of the first panel portion, may extend at least partially the length of each of the pair of flap members of the third panel portion, or any suitable combination thereof. The side seam joint may extend the same length of each of the first panel portion and the third panel portion or may extend different lengths of each of the first panel portion and the third panel portion. In use, wherein the third panel portion is longer than the first panel portion, it is envisaged that the side seam joint may extend substantially the entire length of the first panel portion and at least partially the length of the third panel portion.

In an embodiment of the invention, the process for forming a container from a blank comprises the step of sealing a portion of each of the pair of flap members of the first panel portion to a portion of each of the pair of flap members of the third panel portion to form a side seam joint and sealing an edge of the third panel portion in a single operation. In this instance, it is envisaged that the side seam joint and the edge seal are continuous along a length of the third panel portion.

Any suitable technique to seal a portion of each of the pair of flap members of the first panel portion to a portion of each of the pair of flap members of the third panel portion to form a side seam joint may be used. However, it will be understood that the method of forming a side seam joint may vary depending on a number of factors, such as the type of thermal insulation sheet material to be sealed, the thickness of the thermal insulation sheet material, and the degree of sealing required. For instance, the side seam joint of the container blank may be formed by using an adhesive or adhesive tape, impulse heat treatment, heat treatment, chemical treatment, mechanical treatment (such as ultrasonic welding, compression, and the like), or a combination thereof. In an embodiment of the invention, a portion of the first panel portion may be sealed to a portion of the third panel portion using a heat treatment. In this instance, it is envisaged that one or more layers of the thermal insulation sheet material associated with the first panel portion may be heat sealed to one or more adjacent layers of the thermal insulation sheet material associated with third panel portion to form the side seam joint. In an embodiment of the invention, at least a portion of the periphery of the first panel portion and/or the third panel portion may be folded prior to forming a side seam joint.

In use, it is envisaged that the first panel portion and the third panel portion may be superimposed over one another such that an inner facing of the first panel portion may abut the inner facing of the third panel portion and at least a portion of the superimposed panel portions placed into a sealing device. Preferably, each of the pair of flap members of the first panel portion and third panel portion may be superimposed over one another such that an inner facing of each of the pair of flap members of the first panel portion may abut the inner facing of each of the pair of flap members of the third panel portion and at least a portion of the superimposed panel portions placed into a sealing device. In an embodiment of the invention, a portion of the superimposed panel portions placed into a sealing device may extend outwardly from the sealing device. Preferably, a portion of the flap members of the superimposed panel portions placed into a sealing device may extend outwardly from the sealing device. In this instance, it is envisaged that the portion of the superimposed first and third panel portions extending outwardly from the sealing device may form part of the side seam joint.

In a preferred embodiment of the invention, the superimposed first and third panel portions may be pre-treated prior to forming the side seam joint. Preferably, the superimposed flap members of the first and third panel portions may be pre-treated prior to forming the side seam joint. In use, it is envisaged that the pre-treatment step may occur before or after the superimposed panel portions are placed into a sealing device. In this instance, it is envisaged that the sealing device may hold the superimposed panel portions in place while the pre-treatment operation is performed, may effect the pre-treatment of the superimposed panel portions before the sealing the superimposed panel portions to each other, or any suitable combination thereof. Advantageously, the pre-treatment step may assist in forming side seam joints having improved water and thermal resistance.

Any suitable type of pre-treatment may be used. For instance, the superimposed flap members of the first and third panel portions may be pre-compressed to reduce the thermal insulation layer thickness prior to forming the side seam joint and/or bottom seam joint. In this instance, it is envisaged that at least a portion of the flap members of the first and third panel portions may be permanently pre-compressed. In this instance, it is envisaged that a rotary die cutting and/or sealing process may assist in forming the side seam joint and/or bottom seam joint by pre-compressing the thermal insulation layer. For instance, the inner facings of the superimposed panel portions may be provided with an adhesive, may be chemically treated, may be thermally treated (such as, but not limited to, hot air treatment, or the like), may be subjected to an electrical discharge treatment (such as, but not limited to corona discharge treatment, a plasma treatment, or the like), or any suitable combination thereof. In this instance, it is envisaged that after the inner facings of the superimposed panel portions are pre-treated, the sealing device may provide a source of heat and/or pressure which effects the sealing process. For instance, the outer facings of the superimposed panel portions may be heated directly by contact with a surface of the sealing device or indirectly by contact with the semi-molten insulation layer.

In an embodiment of the invention, the superimposed flap members of the first and third panel portions may be pre-treated so as to facilitate the sealing of the superimposed flap members to each other. In an embodiment of the invention, a portion of the superimposed flap members of the first and third panel portions may be spread apart such that the superimposed flap members of the first and third panel portions form an opening. Any suitable opening may be formed. Preferably however, the angle formed when he superimposed panel portions may be spread apart may be substantially symmetrical. In this instance it will be understood that the opening may be at its most narrow in proximity to the sealing device such that the opening forms a substantially V-shaped configuration. The V-shaped opening between the flap members of the first and third panel portions may be of any suitable angle. In an embodiment of the invention, the V-shaped opening may form an angle of up to 180°, preferably an angle of up to 170°, preferably an angle of up to 160°, preferably an angle of up to 150°, preferably an angle of up to 140°, preferably an angle of up to 130°, preferably an angle of up to 120°, preferably an angle of up to 110°, preferably an angle of up to 100°, preferably an angle of up to 90°, preferably an angle of up to 80°, preferably an angle of up to 70°, preferably an angle of up to 60°, preferably an angle of up to 50°, preferably an angle of up to 40°, preferably an angle of up to 30°, preferably an angle of up to 20°, preferably an angle of up to 10°. Preferably, the V-shaped opening between the flap members of the first and third panel portions may form an angle of about 5° to 90°, preferably an angle of about 10° to 80°, preferably an angle of about 15° to 70°, preferably an angle of about 15° to 60°, preferably an angle of about 15° to 50°, preferably an angle of about 15° to 45°.

In a preferred embodiment of the invention a source of hot air and/or an electrical discharge treatment may be applied to the V-shaped opening to soften and fuse together the inner facings of the flap members of the first and third panel portions.

Any suitable sealing device may be used to form the side seam joint and/or bottom seam joint. For instance, the sealing device may be a rotary welder, a hot plate welding process, or the like. For instance, the sealing device may apply heat directly (such as hot air welding, hot wedge welding, or the like) or indirectly (such as ultrasonic welding, electromagnetic welding, radio-frequency welding, or the like). Preferably, however the sealing device may provide sufficient heat and pressure to seal a portion of each of the flap members of the first panel portion to a portion of each of the flap members of the third panel portion. In an embodiment of the invention, the sealing device used to form a side seam joint between a portion of each of the flap members of the first panel portion and a portion of each of the flap members of the third panel portion is the same sealing device used to form an edge seal about at least a portion of the periphery of the container blank. Alternatively, different sealing devices may be used. In some embodiments of the invention, two or more sealing devices may be used. For instance, an impulse welding and a rotary die device may be used. In use, it is envisaged that the two or more sealing devices may be used to effect the sealing of different components of the thermal insulation sheet material.

In an embodiment of the invention, the sealing device comprises at least an upper heat bar, wherein the upper heat bar may be associated with a press frame. In a preferred embodiment of the invention, the sealing device comprises an upper heat bar and a lower heat bar, wherein the upper heat bar may be associated with a press frame. In an embodiment of the invention, the upper heat bar and/or the lower heat bar may be provided with a profiled surface to facilitate heating and/or cooling of a working face of the upper heat bar and/or the lower heat bar. In a preferred embodiment of the invention, the profiled surface comprises one or more channels extending at least partially through the working face of the upper heat bar and/or the lower heat bar. In this instance, it is envisaged that pre-treating the thermal insulation sheet material by applying hot air to the container blank during sealing, softens an inner insulation layer of the thermal insulation sheet material, reducing the thickness of the side seam joint and improving the ability of the container to be flat packed. In a further embodiment of the invention, the upper heat bar and/or the lower heat bar may be associated with a cooling manifold to facilitate cooling of a working face of the upper heat bar and/or the lower heat bar. In use, it is envisaged that cooling the compressed seam joint under pressure allows molten or semi-molten polymers in the thermal insulation sheet material to solidify whilst in contact, improving the water resistance and thermal resistance of the side seam joint.

The upper heat bar of the sealing device may be associated with a press frame. In this instance, it is envisaged that the press frame may provide compressive support to the upper heat bar which facilitates the compression of the insulation layer of the thermal insulation sheet material and significantly reduces the thickness of the joined portions. The press frame may provide compressive support to the upper heat bar by any suitable means. Preferably, compressing the fused panel portions using a heat treatment under a comprehensive force forms a laminated material at the side seam joint and/or bottom seam joint.

In an embodiment of the invention, a portion of each of the flap members of the first panel portion may be sealed to a portion of each of the flap members of the third panel portion of the container blank using impulse welding. In this instance, it is understood that the portion of the container blank being sealed remains under pressure during heating. Preferably, the sealing process comprises a cool down phase, wherein the portion of the edges being sealed remains under pressure during a heating and cooling cycle.

In an embodiment of the invention, the sealing device comprises one or more rotary wheels (such as a roller, a cylinder, a drum, or the like), wherein each of the one or more rotary wheels may be configured for a specific operating temperature and clearance may be used to form the side seam joint. In this instance, it is envisaged that the sealing device may comprise an upper rotary wheel and a lower rotary wheel, between which the thermoplastic insulation sheet may pass to form the weld. In use it is envisaged that the rotary wheels may comprise opposing contoured surfaces, wherein in use, as the thermoplastic insulation sheet passes between the rollers it is compressed or pinched between the contoured surfaces forming a seal. In use, it is envisaged that the rotary wheels may be directly and/or indirectly heated so as to seal the thermoplastic sheet material under heat and compressive force.

In an embodiment of the invention, excess material may be trimmed after the side seam joint is formed. In this instance, it is envisaged that a cutting bar associated with the sealing device may be used to trim excess material. In an embodiment of the invention, a rotary die cutting process may form a side seam joint by thermal compression and trim excess material simultaneously.

The process for forming a container from a blank comprises the step of sealing a portion of the first panel portion adjacent the side seam joint and a portion of the third panel portion adjacent the side seam joint to an edge of the second panel portion to form a bottom seam joint. Preferably, the process for forming a container from a blank comprises the step of sealing a first flap member of the first panel portion adjacent the side seam joint and a third flap member of the third panel portion adjacent the side seam joint to an edge of the second panel portion such that, when assembled, each of the flap members overlies an edge of the second panel portion substantially perpendicular to the first common edge and the second common edge.

Any suitable technique to seal a portion of the first panel portion adjacent the side seam joint and a portion of the third panel portion adjacent the side seam joint to an edge of the second panel portion to form a bottom seam joint may be used. However, it will be understood that the method of forming a bottom seam joint may vary depending on a number of factors, such as the type of thermal insulation sheet material to be sealed, the thickness of the thermal insulation sheet material, and the degree of sealing required. For instance, the bottom seam joint of the container blank may be formed by using an adhesive or adhesive tape, impulse heat treatment, heat treatment, chemical treatment, mechanical treatment (such as ultrasonic welding, compression, and the like), or a combination thereof. In an embodiment of the invention, a portion of the first panel portion adjacent the side seam joint and a portion of the third panel portion adjacent the side seam joint may be sealed to an edge of the second panel portion using a heat treatment. In this instance, it is envisaged that one or more layers of the thermal insulation sheet material associated with each of the first panel portion, the second panel portion and the third panel portion may be heat sealed to form the bottom seam joint. In an embodiment of the invention, at least a portion of the periphery of the second panel portion may be folded prior to forming a bottom seam joint. Preferably, laminating the inner facings of the thermal insulation sheet material together and laminating the outer facings of the thermal insulation sheet material together may be performed substantially simultaneously so as to form the side seam joint and/or bottom seam joint.

In use, it is envisaged that a portion of the first panel portion adjacent the side seam joint and a portion of the third panel portion adjacent the side seam joint may be superimposed over a portion of the second panel portion, such that an inner facing of the portion of the first panel portion adjacent the side seam joint and the portion of the third panel portion adjacent the side seam joint may abut the inner facing of the third panel portion and at least a portion of the superimposed panel portions placed into a sealing device.

In an embodiment of the invention, the sealing device and the sealing technique used to form the bottom seam joint may be the same as the sealing device and the sealing technique used to form the side seam joints. Alternatively, the sealing device and the sealing technique used to form the bottom seam joint may be different to the sealing device and the sealing technique used to form the side seam joints. In an embodiment of the invention, the method of pre-treating the superimposed panel portions to form the bottom seam joint may be the same as the method of pre-treating the superimposed panel portions to form the side seam joint. Alternatively, the method of pre-treating the superimposed panel portions to form the bottom seam joint may be the different to the method of pre-treating the superimposed panel portions to form the side seam joints.

In an embodiment of the invention, excess material may be trimmed after the bottom seam joint is formed. In this instance, it is envisaged that a cutting bar associated with the sealing device may be used to trim excess material. In an embodiment of the invention, a rotary die cutting process may form a bottom seam joint by thermal compression and trim excess material simultaneously.

In an embodiment of the invention, the process for forming a container from a blank comprises the step of welding at least a portion of a seam joint and/or an edge seal. Any suitable seam joint and/or edge seal may be welded. For instance, the seam joint and/or edges seal may be a side seam joint, a bottom seam joint, an edge seal, or any suitable combination thereof. In an embodiment of the invention, the process for forming a container from a blank comprises the step of welding at least a portion of a panel portion adjacent a seam joint to a portion of an adjacent panel portion sharing the same seam joint. In an embodiment of the invention, the process for forming a container from a blank comprises the step of welding at least a portion of a side seam joint to a bottom seam joint. In an embodiment of the invention, the process for forming a container from a blank comprises the step of welding at least a portion of a side seam joint to an edge seal. It is envisaged that welding at least a portion of a seam joint may reinforce the seam joint and/or edge seal.

Any suitable portion of the seam joint and/or the edge seal may be welded. For instance, the seam joint and/or the edge seal may be spot welded at one or more along the length of the seam joint and/or the edge seal, may be welded at least partially the length of the seam joint and/or the edge seal, may be welded substantially the length of the seam joint and/or the edge seal, or any suitable combination thereof. In use, it is envisaged that the welding may be used to reinforce high load points.

In an embodiment of the invention, a plastic filler rod may be used during welding to provide material to join the seam joint and/or edge seal. Alternatively, the welding process softens the material adjacent the seam joint and/or edge seal allowing the softened material to join the seam joint and/or edge seal. In this instance, it is envisaged that a portion of an outer polymer layer of the container blank may be melted to form the weld. In a preferred embodiment of the invention, one or more reinforcing tags may be welded to a seam joint and/or at the intersection of two seam joints. Any suitable reinforcing tag may be used. For instance, the reinforcing tag may be a portion of a plastic filler rod, may be a plastic disc, a plastic sheet material, or the like. The reinforcing tag may be fabricated from any suitable material. In some embodiments of the invention, the reinforcing tag may be the same type of material as an outer layer of the thermal insulation sheet material, or may be a different type of material. Preferably, the reinforcing tag may be the same type of material as an outer layer of the thermal insulation sheet material.

The reinforcing tag may be of any suitable size, shape or configuration. Preferably, however, the reinforcing tag may be of sufficient dimensions that it may cover the seam joint and extend beyond the edges of the seam joint. The reinforcing tag may be of any suitable thickness. For instance, the reinforcing tag may be thinner than an outer layer of the thermal insulation sheet material, substantially similar to an outer layer of the thermal insulation sheet material or thicker than an outer layer of the thermal insulation sheet material. Preferably, the reinforcing tag may be thicker than an outer layer of the thermal insulation sheet material. In use, it is envisaged that the reinforcing tags may be used to reinforce high load points and/or assist in reducing stress along seam joints.

Any suitable type of welding technique may be used. For instance, the welding technique may be hot gas welding, speed tip welding, extrusion welding, contact welding, hot plate welding, non-contact/IR welding, high frequency welding, impulse welding, induction welding, injection welding, ultrasonic welding, friction welding, spin welding, laser welding, solvent welding, or the like. However, it will be understood that the welding technique may vary depending on a number of factors such as the type of material to welded, the size of the seam joint and/or edge seal and the type and purpose of the container. In a preferred embodiment of the invention, the process for forming a container from a blank comprises the step of hot gas welding at least a portion of a seam joint and/or an edge seal. Preferably, the process for forming a container from a blank comprises the step of welding one or more reinforcing tags along at least a portion of a seam joint and/or an edge seal. In an embodiment of the invention, the one or more reinforcing tags may be welded to the seam joint and/or an edge seal using a profiled heat stamp.

In an embodiment of the invention, a compressive force may be applied to the seam joint and/or the edge seal after welding such that the joined portions are held in contact until the weld joint cools and re-solidifies to create a permanent bond.

It is envisaged, that when assembled, a portion of the first panel portion may be folded over into the void formed within the container such that it contacts a portion of the third panel portion extending across the void formed within the container. In use, a portion of the third panel portion may extend across the void formed within the container such that it extends over the outer facing of the first panel portion. In this way, the first panel portion and the third panel portion close the container and form a substantially water-tight container without permanently sealing the container.

In a second aspect of the invention, the invention resides broadly in a container formed from a blank in accordance with the process of the first aspect of the invention. Preferably, the invention resides broadly in a container formed from a blank in accordance with the process of the first aspect of the invention, wherein the thermal insulation sheet material comprises two or more layers and wherein one or more of the layers is a cross-linked closed cell foam layer.

In a third aspect of the invention, the invention resides broadly in a container formed from a blank in accordance with the process of the first aspect of the invention, herein the first panel portion forms a front wall of the container, the third panel portion forms a back wall of the container and the second panel portion forms a bottom wall of the container and wherein a portion of the third panel portion forms a lid portion of the container and wherein a portion of the third panel portion and a portion of the first panel portion interact to close the container.

The present invention provides a number of advantages over the prior art. For instance, the present invention improves flexibility in use through ability to collapse (flat-packed) for convenient "cost effective transport" and convenient storage when not in use without overstressing the packaging material or seam joints. In addition, the process of forming the container creates a laminated material at the seam joints wherein the respective inner and outer facings of the joined panels are laminated to each other which are substantially water-tight and leak-proof and substantially resistant to delamination. For instance, the present invention is environmentally friendly as it eliminates the need to use a single-use plastic liner bags in order to ensure transportation boxes are leak-proof. In addition, the present invention having a box-like configuration substantially conforms to the available space within a packing box, minimising wasted space and preventing damage to the items being transported and essentially eliminates folds and creases which make it easier for re-use. Of particular advantage, is a fully laminated thermal insulation sheet material that has no cavities behind surface barrier films which resists contaminant entry should surface films be punctured by sharp or spiky contents.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 5 illustrates a partially assembled container blank prior to forming a

DETAILED DESCRIPTION

Figure 1:
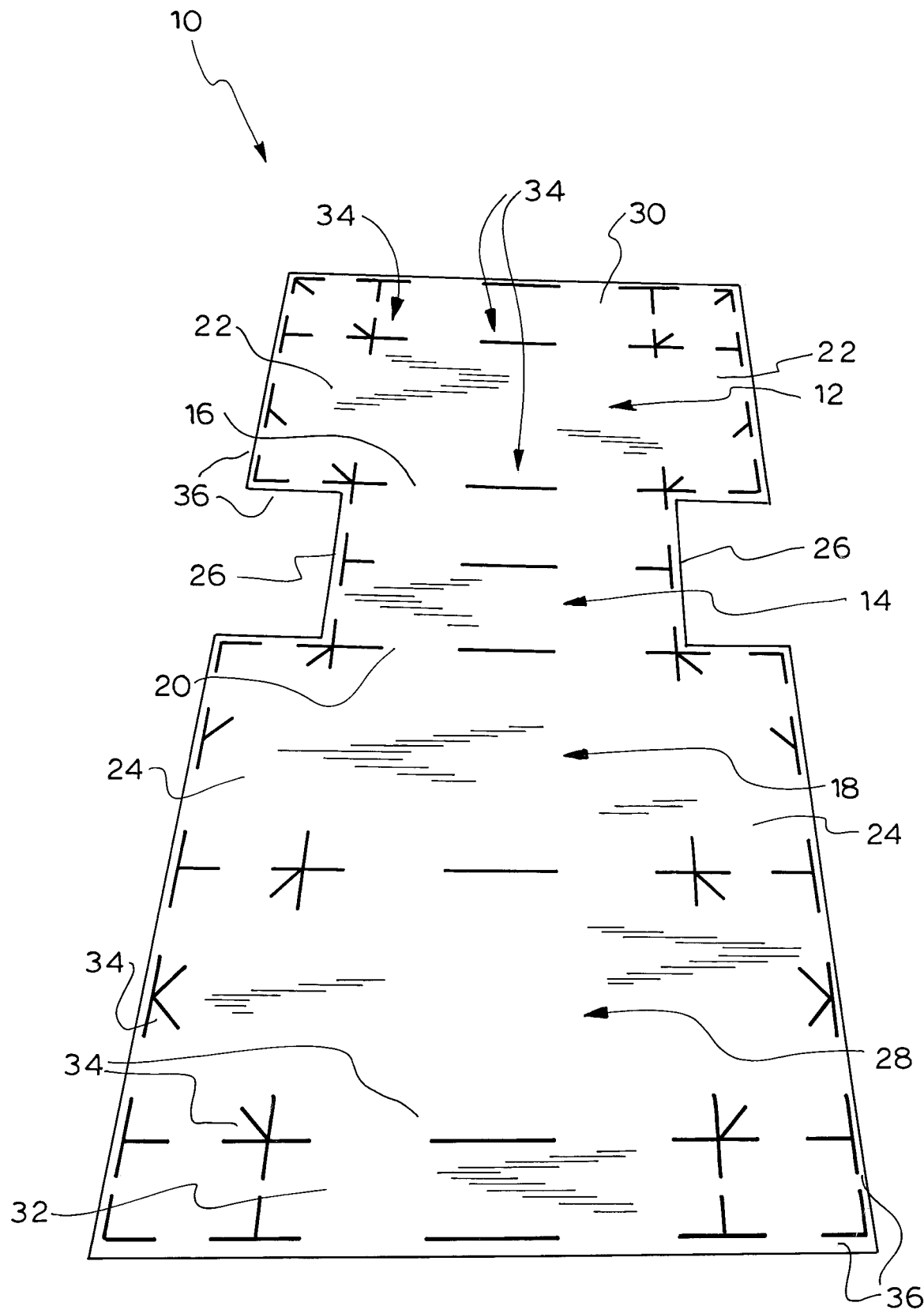
FIG. 1 illustrates a template for preparing a blank for a container according to an embodiment of the invention.

In FIG. 1, a template for a blank for forming a container 10 according to an embodiment of the invention is illustrated. Container blank 10 comprises a first panel portion 12, a second panel portion 14 located adjacent the first panel portion 12 and sharing a first common edge 16 therewith, and a third panel portion 18 located adjacent the second panel portion 14 and sharing a second common edge 20 therewith, the second common edge 20 being substantially parallel to the first common edge 16. The first panel portion 12 and the third panel portion 18 are each associated with a pair of flap members 22, 24 adapted for folding movement relative to the respective first and third panel portion 12, 18 such that, when assembled, each of the flap members 22, 24 overlies an edge 26 of the second panel portion 14 substantially perpendicular to the first common edge 16 and the second common edge 20.

One or more fold lines 34 located in the container blank 10 assist in folding a portion of the container blank relative to an adjacent portion of the container blank. For instance, a fold line 34 located along a first common edge 16 assists in folding first panel portion 12 relative to second panel portion 14.

Additional material 36 located about a portion of the periphery of the container blank may be used to form an edge seal, side seam joint, and/or bottom seam joint.

When assembled, subpanel 28 of third panel portion 18 forms a lid portion of the container and subpanel portion 30 of first panel portion 12 and subpanel portion 32 of third panel portion assist in reusably closing the container.

Figure 2:
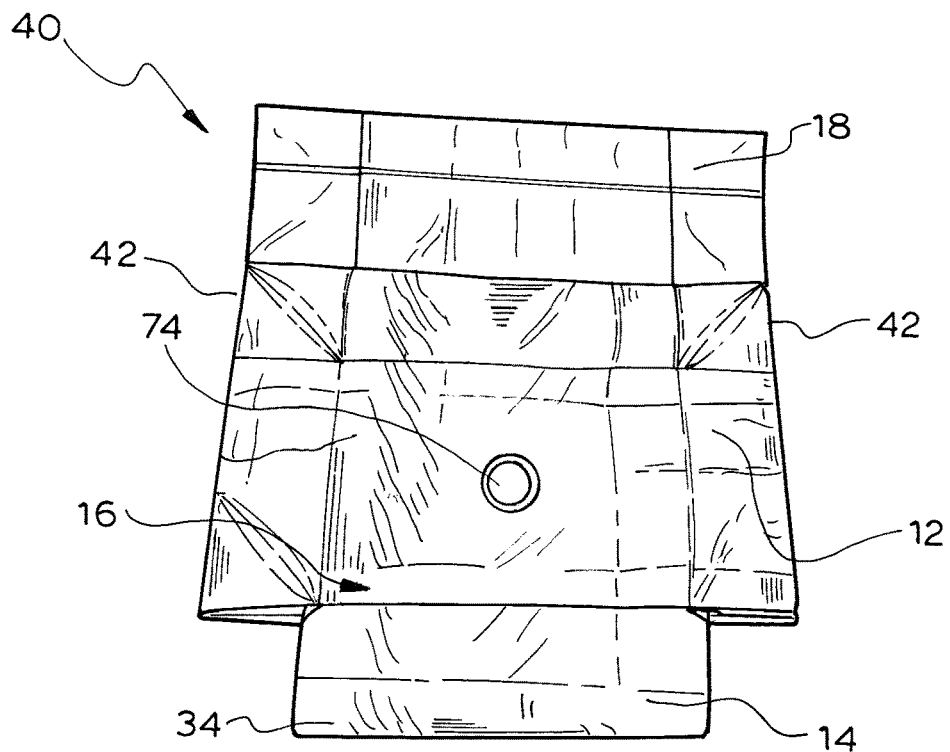
FIG. 2 illustrates a partially assembled container blank in a flat pack configuration, according to an embodiment of the invention.

In FIG. 2 a partially assembled container blank 40 in a flat pack configuration is illustrated. During assembly (and in a flatpack configuration), second panel portion 14 may be folded along a fold line 34 located such that first panel portion 12 and third panel portion 18 may be superimposed over one another such that an inner facing of the first panel portion 12 may abut the inner facing of the third panel portion 18. A portion of the first panel portion 12 may be sealed to a portion of the third panel portion 18 to form side seam joint 42.

Figure 3:
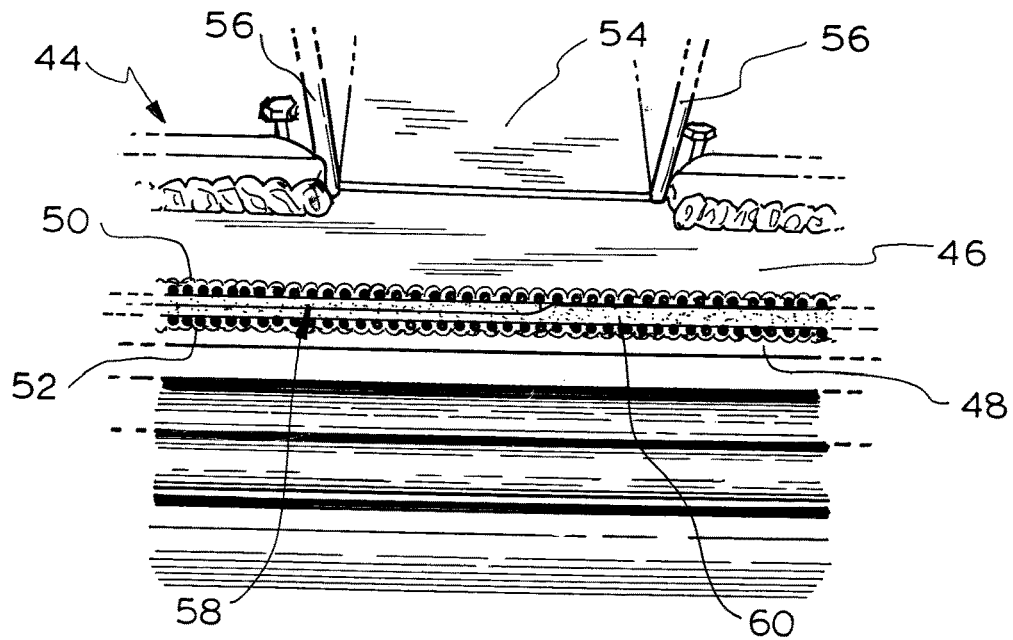
FIG. 3 illustrates superimposed first and third panel portions in a sealing device according to an embodiment of the invention.

In FIG. 3 superimposed first panel portion 12 and third panel portion 18 in a sealing device 44 is illustrated. Sealing device 44 enables sealing a portion of the first panel portion 12 to a portion of the third panel portion 18 to form a side seam joint 58 and sealing an edge 60 of the third panel portion 18 in a single operation. Sealing device 44 comprises an upper heat bar 46 and a lower heat bar 48, wherein the upper heat bar 16 may be associated with a press frame (not shown) via support finger 54. Upper heat bar 46 and lower heat bar 48 may be provided with a profiled surface 50 and 52 respectively to facilitate heating and/or cooling of a working face of the upper heat bar 46 and/or the lower heat bar 48. Profiled surfaces 50, 52 may comprise one or more channels extending at least partially through the working face of the upper heat bar 46 and/or the lower heat bar 48. Temperature probes 56 measure the working face temperature of upper heat bar 46.

In use, it is envisaged that a portion of the superimposed first and third panel portions may be spread apart such that the first and third panel portions form a substantially V-shaped opening of preferably about 15° to 45°. The inner facings of the first and third panel portions may be pre-treated using hot air, plasma treatment, a corona discharge treatment or the like to fuse the inner facings together without damaging the polymer sheet material, before the first and third panel portions are compressed to about 60% of original thickness (for example from about 12 mm to 4 mm) by heat bars. The heat bars may be set at a temperature that is lower than the melt point of the polymer sheet material, essentially protecting the polymer sheet material via heat transfer when the hot air is applied. The application of the hot air to the foam insulation layer causes it to soften and transition into a molten or semi-molten form. Subsequently, a secondary compressive force brings fused inner facings, semi-molten foam insulation material and heated outer polymer sheet materials together under high pressure. The application of secondary heating completes the fusion of all layer of material to form a singular material on the outer edge of the seam or edge seal joins. It provides for a water-tight join and also assists preventing delamination of the material layers.

Figure 4:
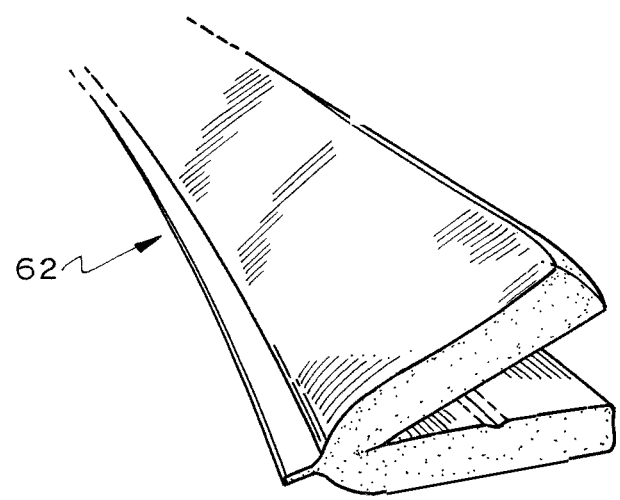
FIG. 4 illustrates a partially formed side seam joint according to an embodiment of the invention.

In FIG. 4 a partially formed side seam joint (or bottom seam joint) 62 is illustrated. The sealing method of the present invention provides a strong water resistant and thermally resistant seam joint and shapes adjacent layers of the container to allow the liner to fold over on itself (flat packable) without straining the seam joint.

Figure 5:
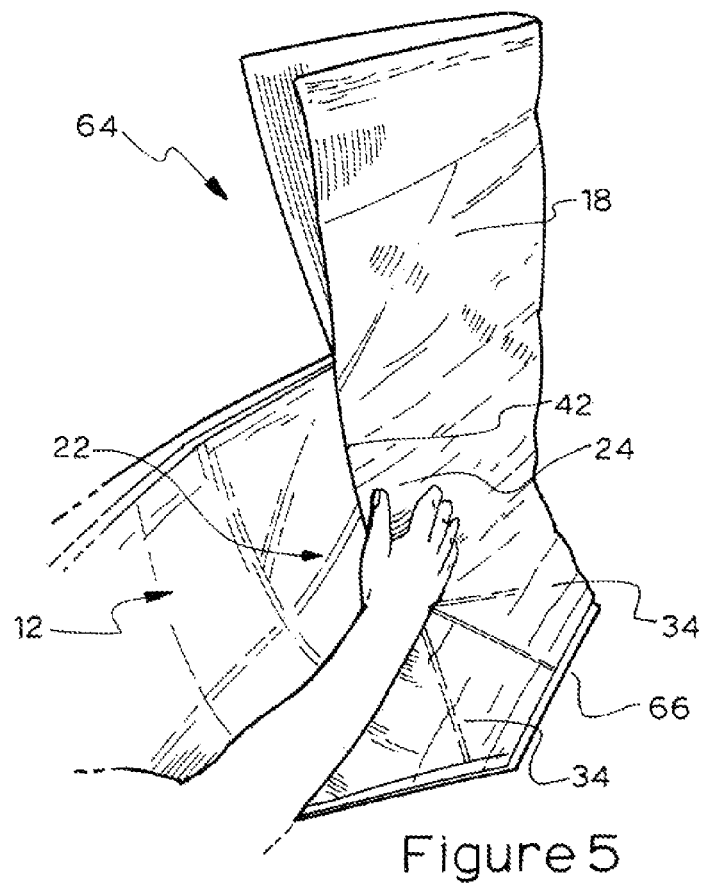

In FIG. 5 a partially assembled container blank 64 prior to forming a bottom seam joint is illustrated. A first flap member 22 of first panel portion 12 adjacent side seam joint 42 and a third flap member 24 of third panel portion 18 adjacent side seam joint 42 may be sealed to an edge 66 of the second panel portion (not shown) to form a bottom seam joint.

Figure 6:
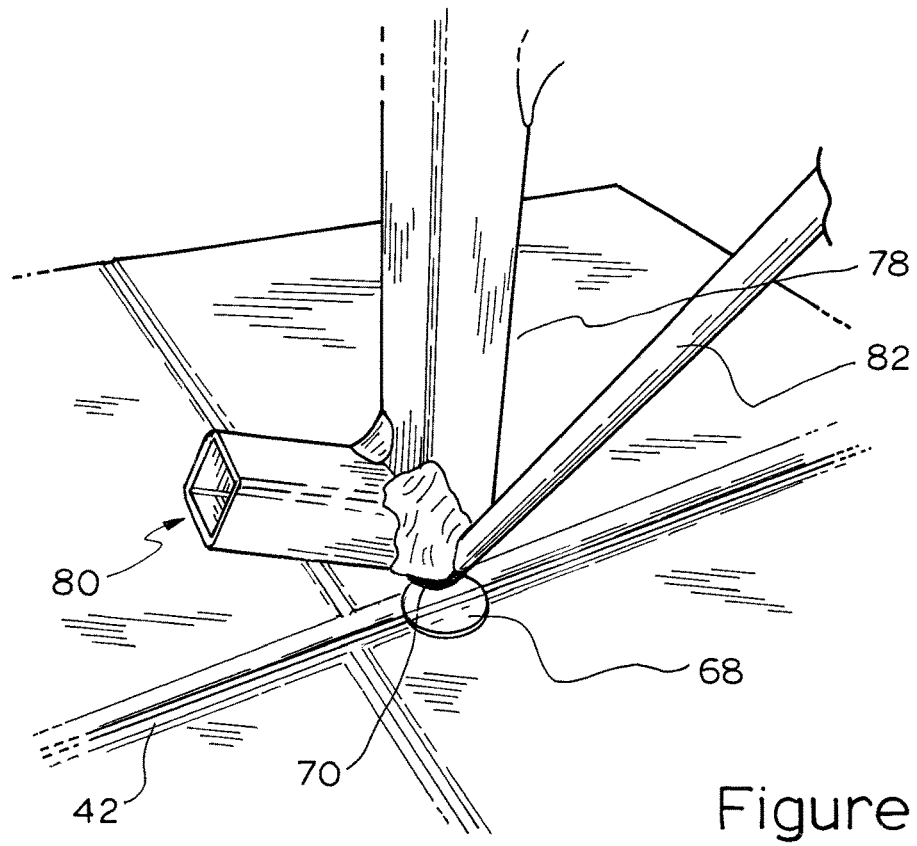
FIG. 6 illustrates a reinforcing tag being embedded in a completed side seam joint according to an embodiment of the invention.
Figure 7:
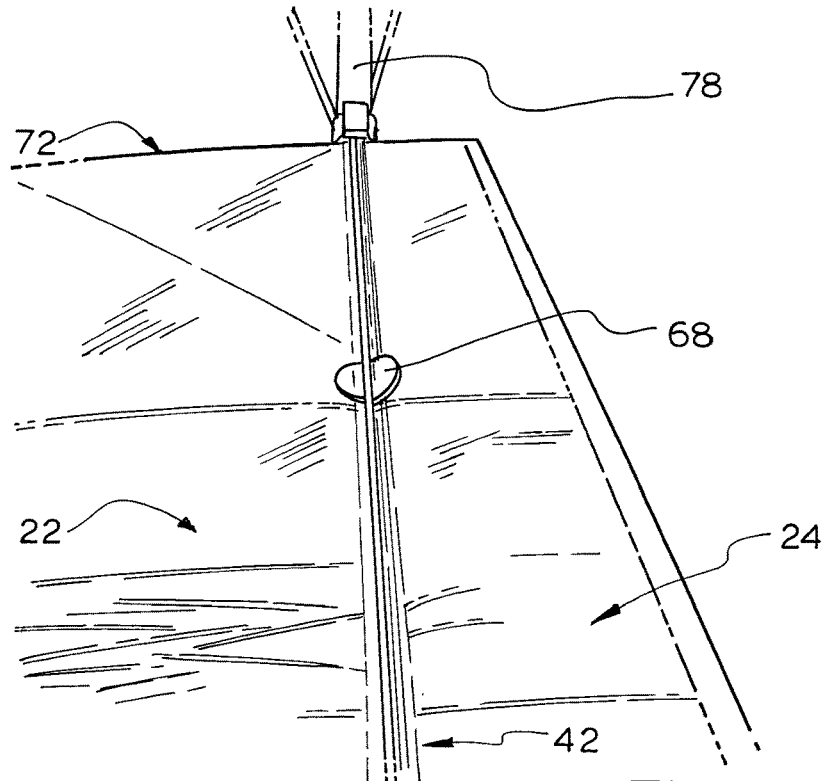
FIG. 7 illustrates a completed side seam joint and a reinforcing tag welded to the side seam joint according to an embodiment of the invention.

In FIGS. 6 and 7, a reinforcing tag 68 being welded to a completed side seam joint 42 is illustrated. Reinforcing tag 68 is welded using a profiled heat stamp 70 within side seam joint 42 to assist in retaining first flap member 22 of first panel portion 12 in proximity to third flap member 24 of third panel portion 18. Reinforcing tag 68 is welded at the junction of side seam joint 42 and bottom seam joint 72. Manifold 78 supplies a hot gas to profiled heat stamp 70 with exhaust gas exiting manifold 78 through port 80. Temperature probe 82 measures the temperature of the profiled heat stamp 70. When assembled, it is envisaged that reinforcing tag 68 assists in reducing stress about the seam joints 42, 72.

Figure 8:
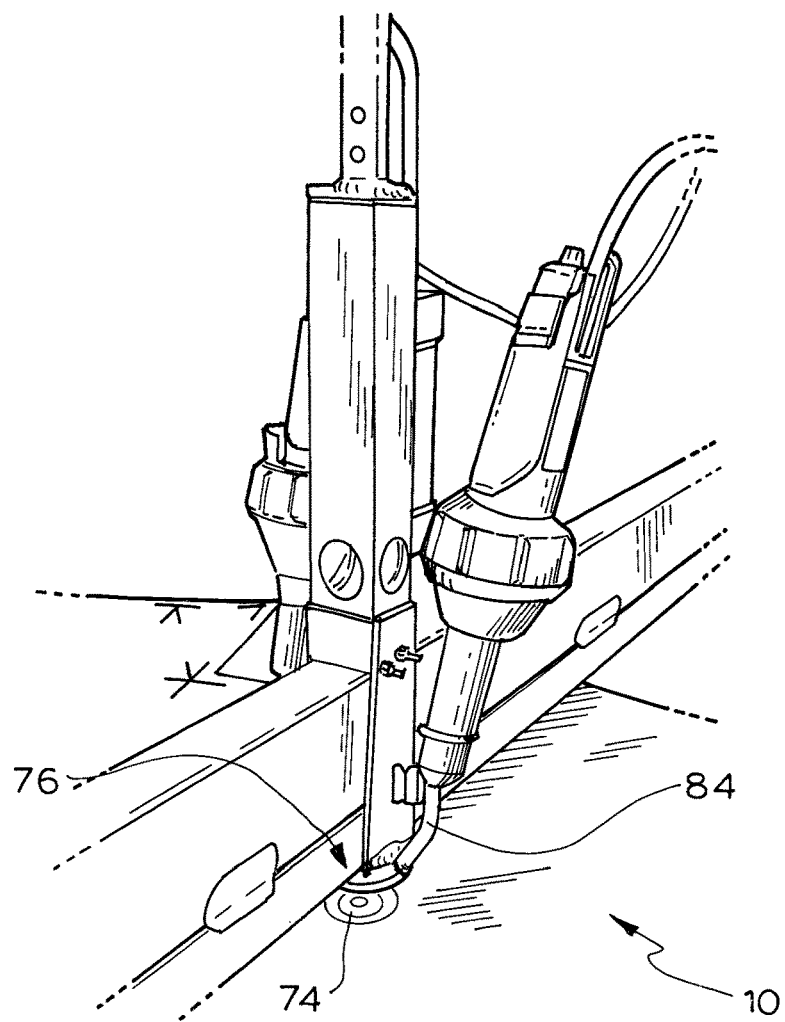
FIG. 8 illustrates a monitoring device being embedded in a container blank according to an embodiment of the invention.
Figure 9:
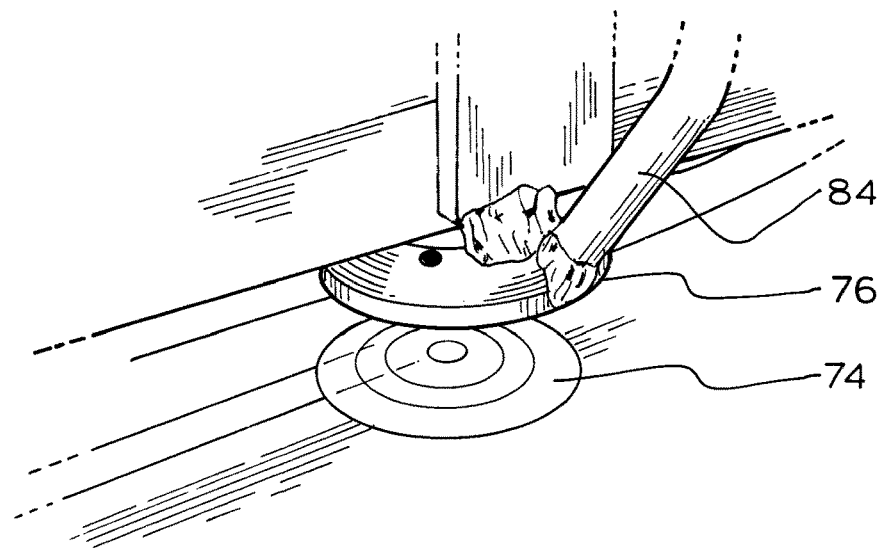
FIG. 9 illustrates a monitoring device embedded in a container blank according to an embodiment of the invention.

In FIGS. 8 and 9, a monitoring device 74 being embedded in a container blank 10 is illustrated. Monitoring device 74 is embedded in container blank 10 using a profiled heat stamp 76 using hot gas supplied by manifold 84.

Figure 10:
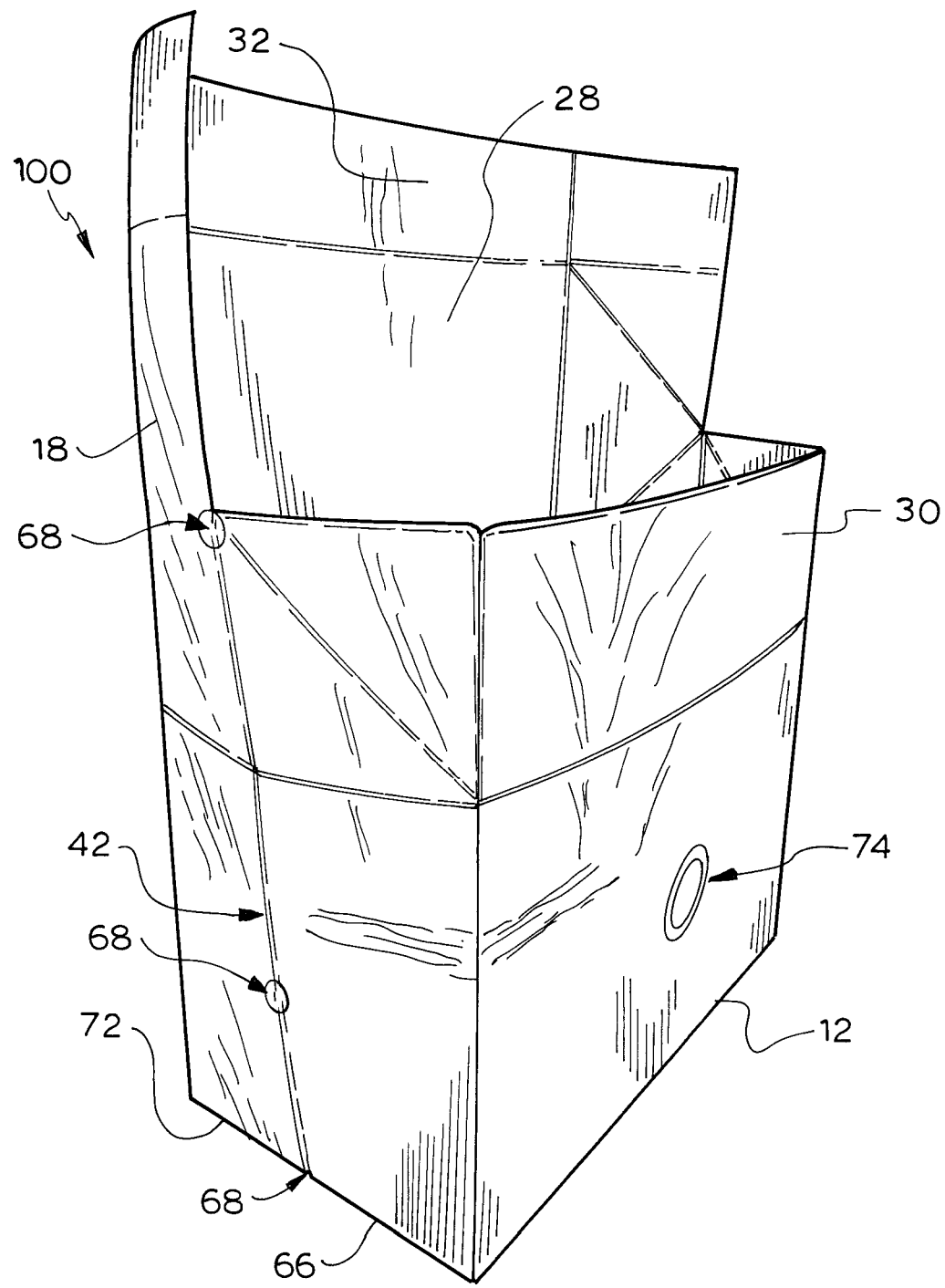
FIG. 10 illustrates an assemble container formed according to the process of the invention.

In FIG. 10, an assembled container 100 formed according to the process of the invention is illustrated. Assembled container 100 is assembled by folding a portion of first panel portion 12 of the container blank along a first fold line, wherein when folded, the first panel portion (front wall) 12 is substantially perpendicular to a second panel portion (bottom wall, not shown) of the container blank and folding a third panel portion (back wall) 18 of the container blank along a second fold line, wherein when folded, the third panel portion 18 is substantially perpendicular to the second panel portion (bottom wall, not shown) and substantially parallel to the first panel portion 12, A side seam joint 42 is formed by sealing a portion of the first panel portion 12 to a portion of the third panel portion 18 and a bottom seam joint 72 is formed by sealing a portion of the first panel portion 12 adjacent the side seam joint 42 and a portion of the third panel portion 18 adjacent the side seam joint 42 to an edge 66 of the second panel portion (not shown). Reinforcing tags 68 are applied to side seam joint 42 and to the join between the side seam joint 42 and bottom seam joint 72. Assembled container 100 comprises an embedded sensor 74 within the first panel portion (front wall) 12.

In use, subpanel 28 of third panel portion 18 forms a lid portion of the container and subpanel portion 30 of first panel portion 12 and subpanel portion 32 of third panel portion assist in reusably closing the container.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A process for forming a container from a blank, the process comprising the steps of:
   thermally inducing one or more fold lines on at least one surface of a container blank fabricated from a thermal insulation sheet material, wherein the blank comprises:
      a first panel portion;
      a second panel portion located adjacent the first panel portion and sharing a first common edge therewith; and
      a third panel portion located adjacent the second panel portion and sharing a second common edge therewith, the second common edge being parallel to the first common edge,
      wherein the first panel portion and the third panel portion are each associated with a pair of flap members adapted for folding movement relative to the respective first and third panel portions such that, when assembled, each of the flap members overlies an edge of the second panel portion perpendicular to the first common edge and the second common edge,
   folding the first panel portion of the container blank along a first fold line, wherein when folded, the first panel portion is perpendicular to the second panel portion of the container blank;
   folding the third panel portion of the container blank along a second fold line, wherein when folded, the third panel portion is perpendicular to the second panel portion and parallel to the first panel portion;
   sealing a portion of each of the pair of flap members of the first panel portion to a portion of each of the pair of flap members of the third panel portion to form a side seam joint; and
   sealing a portion of the first panel portion adjacent the side seam joint and a portion of the third panel portion adjacent the side seam joint to an edge of the second panel portion to form a bottom seam joint.

2. The process for forming a container from a blank according to claim 1, further comprising the step of:
   folding the third panel portion along a fold line to form a subpanel portion, wherein when folded, the subpanel portion of the third panel portion is parallel to the second panel portion, and wherein when assembled, the subpanel portion closes the container.

3. The process for forming a container from a blank according to claim 1 or claim 2, further comprising the step of:
   sealing one or more edges of the container blank to form one or more edge seals.

4. The process for forming a container from a blank according to claim 3, wherein the one or more edge seals, one or more side seam joints and/or one or more bottom seam joints are sealed using a heat treatment under compressive force.

5. The process for forming a container from a blank according to claim 1, wherein sealing the portion of the first panel portion to the portion of the third panel portion to form the side seam joint comprises the steps of:
   superimposing the first panel portion over the third panel portion, such that an inner facing of the first panel portion abuts an inner facing of the third panel portion;
   placing at least a portion of the superimposed panel portions in a sealing device such that a portion of the flap members of the superimposed panel portions extend outwardly from the sealing device;
   pre-treating the superimposed panel portions; and
   providing a heat treatment under compressive force to the superimposed panel portions to fuse respective inner facings and/or outer facings of the flap members of the first and third panel portions together.

6. The process for forming a container from a blank according to claim 5, wherein the pre-treating step comprises pre-compressing the superimposed panel portions before the superimposed panel portions are compressed together.

7. The process for forming a container from a blank according to claim 5, wherein the pre-treating step comprises preparing the inner facings of the flap members of the first and third panel portions before the superimposed panel portions are compressed together.

8. The process for forming a container from a blank according to claim 1, wherein sealing the portion of the first panel portion adjacent the side seam joint and the portion of the third panel portion adjacent the side seam joint to the edge of the second panel portion to form the bottom seam joint comprises the steps of:
   superimposing the portion of the first panel portion adjacent the side seam joint and the portion of the third panel portion adjacent the side seam joint over a portion of the second panel portion, such that inner facings of the first panel portion and the third panel portion abut an inner facing of the second panel portion;
   placing at least a portion of the superimposed panel portions in a sealing device such that a portion of the superimposed panel portions extend outwardly from the sealing device;
   pre-treating the superimposed panel portions; and
   providing a heat treatment under compressive force to the superimposed panel portions to fuse the inner facings and/or outer facings of the first and third panel portions to the inner facing and/or outer facing of the second panel portion.

9. The process for forming a container from a blank according to claim 8, wherein the pre-treating step comprises pre-compressing the superimposed panel portions before the superimposed panel portions are compressed together.

10. The process for forming a container from a blank according to claim 8, wherein the pre-treating step comprises preparing the inner facings of the first, second and third panel portions before the superimposed panel portions are compressed together.

11. The process for forming a container from a blank according to claim 2, wherein one or more edge seals, one or more side seam joints and/or one or more bottom seam joints are simultaneously sealed using a heat treatment under compressive force and trimmed to remove excess material.

12. The process for forming a container from a blank according to claim 2, further comprising the step of:
   welding at least a portion of a seam joint, an edge seal, and/or an intersection of two or more seam joints and/or edge seals, wherein each seam joint is a leak proof side seam joint or a leak proof bottom seam joint.

13. The process for forming a container from a blank according to claim 12, wherein one or more reinforcing tags are welded to at least a portion of the seam joint, the edge seal, and/or at the intersection of the two or more seam joints and/or edge seals.

14. The process for forming a container from a blank according to claim 13, wherein the one or more reinforcing tags are welded to the seam joint, the edge seal, and/or at the intersection of the two or more seam joints and/or edge seals using a profiled heat stamp.

15. The process for forming a container from a blank according to claim 13, wherein the one or more reinforcing tags are welded to the seam joint, the edge seal, and/or at the intersection of the two or more seam joints and/or edge seals using impulse welding.

16. The process for forming a container from a blank according to claim 1, further comprising the step of:
   embedding one or more monitoring devices in at least one surface of the container blank.

17. The process for forming a container from a blank according to claim 16, wherein the one or more monitoring devices are embedded in the container blank using a profiled heat stamp.

18. The process for forming a container from a blank according to claim 16, wherein the one or more monitoring devices are embedded in the container blank using impulse welding.

19. The process for forming a container from a blank according to claim 1, wherein the thermal insulation sheet material comprises two or more layers, and wherein one or more of the layers is a cross-linked closed cell foam layer.

20. The process for forming a container from a blank according to claim 19, wherein the cross-linked closed cell foam layer is encapsulated between one or more layers of a reflective material and one or more layers of a food-grade antimicrobial material.

21. The process for forming a container from a blank according to claim 19, wherein the thermal insulation sheet material is a flexible thermal insulation sheet material.

22. The process for forming a container from a blank according to claim 19, wherein the thermal insulation sheet material is a water-resistant thermal insulation sheet material.

* * * * *